(12) United States Patent
Lee (10) Patent No.: US 9,310,100 B2
(45) Date of Patent: Apr. 12, 2016

(54) APPARATUS FOR AMPLIFYING SOLAR ENERGY BY RECYCLING GREENHOUSE GAS

(76) Inventor: Yong Lee, Seoul (KR)

( * ) Notice: Subject to any disclaimer, the term of this patent is extended or adjusted under 35 U.S.C. 154(b) by 1025 days.

(21) Appl. No.: 13/261,274

(22) PCT Filed: Oct. 21, 2010

(86) PCT No.: PCT/KR2010/007234
§ 371 (c)(1),
(2), (4) Date: Aug. 12, 2013

(87) PCT Pub. No.: WO2011/049386
PCT Pub. Date: Apr. 28, 2011

(65) Prior Publication Data
US 2014/0102439 A1     Apr. 17, 2014

(30) Foreign Application Priority Data

Oct. 22, 2009   (KR) .................. 10-2009-0100836

(51) Int. Cl.
| | |
|---|---|
| *F24J 2/26* | (2006.01) |
| *F24J 2/30* | (2006.01) |
| *F24J 2/48* | (2006.01) |
| *F24J 2/50* | (2006.01) |
| *F24J 2/46* | (2006.01) |

(52) U.S. Cl.
CPC .... *F24J 2/26* (2013.01); *F24J 2/30* (2013.01); *F24J 2/485* (2013.01); *F24J 2/507* (2013.01); *F24J 2002/4676* (2013.01); *F24J 2002/502* (2013.01); *Y02E 10/44* (2013.01)

(58) Field of Classification Search
CPC .................. F24J 2/24; F24J 3/02; F24J 2/46; F24J 2/05

USPC ............ 126/654, 656, 271, 659; 428/69, 116
See application file for complete search history.

(56) References Cited

U.S. PATENT DOCUMENTS

| | | | | |
|---|---|---|---|---|
| 4,055,163 A * | 10/1977 | Costello | ............... | F24D 11/003 126/588 |
| 4,255,213 A * | 3/1981 | Redmond | ............... | C23C 22/70 126/569 |
| 4,325,359 A * | 4/1982 | Fries | .................. | F24J 2/14 126/678 |
| 5,270,092 A * | 12/1993 | Griffith | ................. | B32B 3/12 428/116 |
| 5,431,149 A * | 7/1995 | Fossum | ................. | F24J 2/265 126/659 |
| 5,461,496 A * | 10/1995 | Kanada | ................. | E06B 9/24 359/592 |
| 5,596,981 A * | 1/1997 | Soucy | .................. | E06B 3/6612 126/569 |
| 8,257,805 B2 * | 9/2012 | Landon | ................. | B82Y 30/00 428/34 |

* cited by examiner

*Primary Examiner* — Gregory Huson
*Assistant Examiner* — Nikhil Mashruwala
(74) *Attorney, Agent, or Firm* — G W i P S (57) ABSTRACT

An apparatus for amplifying the solar energy by recycling the greenhouse gas has developed to heat up the gas passing through the sealed container. The apparatus of amplifying the solar energy is comprising: a body made of metal with opened top forming a container; the upper and lower metal meshes disposed in the container with a vertical distance from the bottom for forming a space; a metal pipe formed a coiled shape to dispose between upper and lower metal meshes to contact with the upper and lower metal meshes and having one inlet and the other outlet for passing through the side wall of the container; and two transparent panels for transmitting the sun beams, which are disposed over the upper metal mesh to seal the container space inside of the body. Further, the body has a gas-charging valve disposed on a side wall to charge the sulfur hexafluoride SF6 to the sealed space.

7 Claims, 5 Drawing Sheets

APPARATUS FOR AMPLIFYING SOLAR ENERGY BY RECYCLING GREENHOUSE GAS

BACKGROUND OF THE INVENTION

1. Field of the Invention

The present invention relates to an apparatus for amplifying solar energy used for recycling greenhouse gas. More particularly, the apparatus is amplified by the solar energy while the greenhouse gas is passing through a sealed compartment to heat-up to increase the temperature of gas in the sealed compartment without electrical power. The apparatus is made of a metal box to form a compartment with a coiled tube, the upper and lower metal meshes acting as fins, a pair of the transparent lids.

2. Related Prior Art

The solar energy is one of the major natural energy, which can be utilized to the human life. Recently, a lot of researches have performed in order to utilize the solar energy available in our lives. The utilizing of the solar energy has a merit to prevent the environmental pollution, too.

Generally, a conventional method for obtaining the commercial energy from the sun, the thermal energy is produced by using the solar cells. However, the structure of the solar cell system is so complicated. Furthermore, the construction cost of the solar energy system is undesirably expensive. Therefore, there is a demand raised for developing a simple and cheap energy transforming device, which is efficiently transforming the solar energy converting to the thermal energy.

SUMMARY OF THE INVENTION

Accordingly, the present invention has made in view of aforementioned problems encountered in the prior art. It is an object of the present invention to provide an apparatus for amplifying the solar energy by recycling greenhouse gas, which has a simple structure with a low cost. This device utilizes the solar energy to heat up the gas passing through the sealed space. Thereby, the sealed space will be increased the temperature without electrical power. The green energy allows heating up the water and air by heat exchanger, without producing pollutant.

To accomplish the above object, according to the present invention, there is provided an apparatus for amplifying solar energy using recycling greenhouse gas, including: a body formed of a metal material and having a shape open on the top surface thereof and with a space formed at the inside thereof; upper and lower metal meshes disposed in the space of the body in such a manner as to be spaced apart upwardly and downwardly from each other by a given distance in a horizontal relation to the bottom surface of the body; a metal pipe formed in the folded shape to face, by a plurality of times, disposed between the upper and lower metal meshes in such a manner as to be brought into close contact with the upper and lower metal meshes and having one end and the other end respectively penetrating a side wall of the body; and one or more light-transmitting panels disposed over the upper metal mesh so as to seal the space inside the body, wherein the body further has a gas-charging valve disposed on a side wall thereof so as to charge sulfur hexafluoride (SF6) to the sealed space thereof.

According to the present invention, desirably, the metal pipe has liquid or gas supplied to one end thereof, the inner surfaces of the body, the upper and lower metal meshes and the metal pipe are coated with black paint, the body further has an insulation case adapted to seal the outer surfaces thereof and an insulation material filled in a space between the insulation case and the body, the gas-charging valve has a gas pressure gauge disposed thereon so as to check the charging state of the sulfur hexafluoride (SF6), and each of the light-transmitting panels has a center portion with a convex shape toward the bottom surface of the body.

According to the present invention, desirably, the light-transmitting panel disposed at the lowermost position of the one or more light-transmitting panels is formed of glass and disposed along seating protrusions formed along the inner surfaces of the body and fixed thereto by means of an adhesive, and the light-transmitting panel disposed at the uppermost position of the one or more light-transmitting panels is formed of Polycarbonate and inserted into insertion grooves formed along the inner surfaces of the body facing the light-transmitting panel through the application of an external force and fixed thereto by means of an adhesive.

According to the present invention, the apparatus for amplifying solar energy using recycling greenhouse gas is structured to seal the inner space of the body, thereby preventing the solar heat collected in the inner space of the body from being emitted to the outside, and at the same time to allow the solar light reflected at various angles through the collision with the upper and lower metal meshes to be reacted with the sulfur hexafluoride SF6, thereby easily causing the greenhouse effect and increasing the temperature of the metal pipe, so that the heated liquid and gas passing through the metal pipe can be applicable for the use of hot water supply and heating.

DETAILED DESCRIPTION OF THE PREFERRED EMBODIMENTS

The present invention relates to an apparatus for amplifying solar energy using recycling greenhouse gas, including: a body formed of a metal material and having a shape open on the top surface thereof and with a space formed at the inside thereof; upper and lower metal meshes disposed in the space of the body in such a manner as to be spaced apart upwardly and downwardly from each other by a given distance in a horizontal relation to the bottom surface of the body; a metal pipe formed in the folded shape to face, by a plurality of times, disposed between the upper and lower metal meshes in such a manner as to be brought into close contact with the upper and lower metal meshes and having one end and the other end respectively penetrating a side wall of the body; and one or more light-transmitting panels disposed over the upper metal mesh so as to seal the space inside the body, wherein the body further has a gas-charging valve disposed on a side wall thereof so as to charge sulfur hexafluoride SF6 to the sealed space thereof.

Hereinafter, an explanation on an apparatus for amplifying solar energy using recycling greenhouse gas according to the present invention will be in detail given with reference to the attached drawings.

Figure 1:
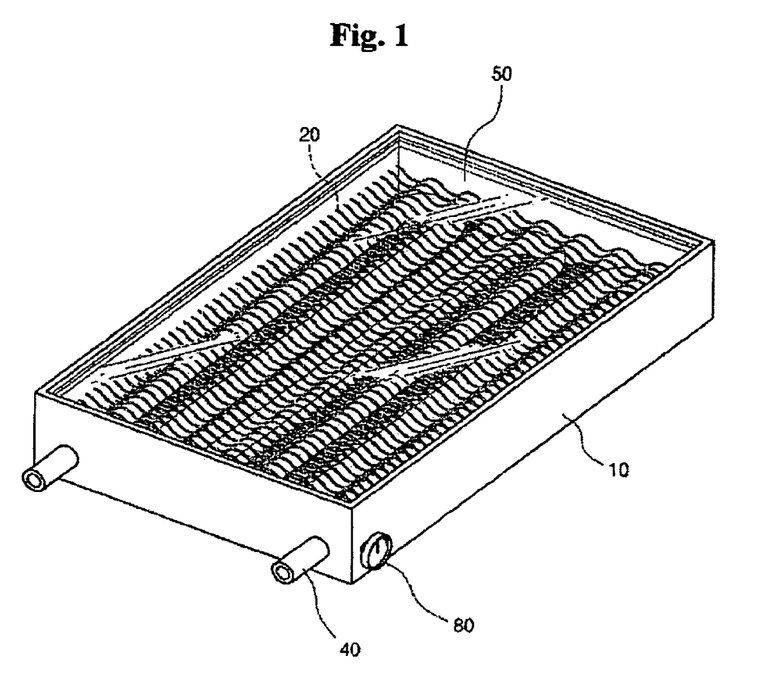
FIG. 1 is an assembling perspective view showing an apparatus for amplifying solar energy using recycling greenhouse gas according to the present invention.
Figure 2:
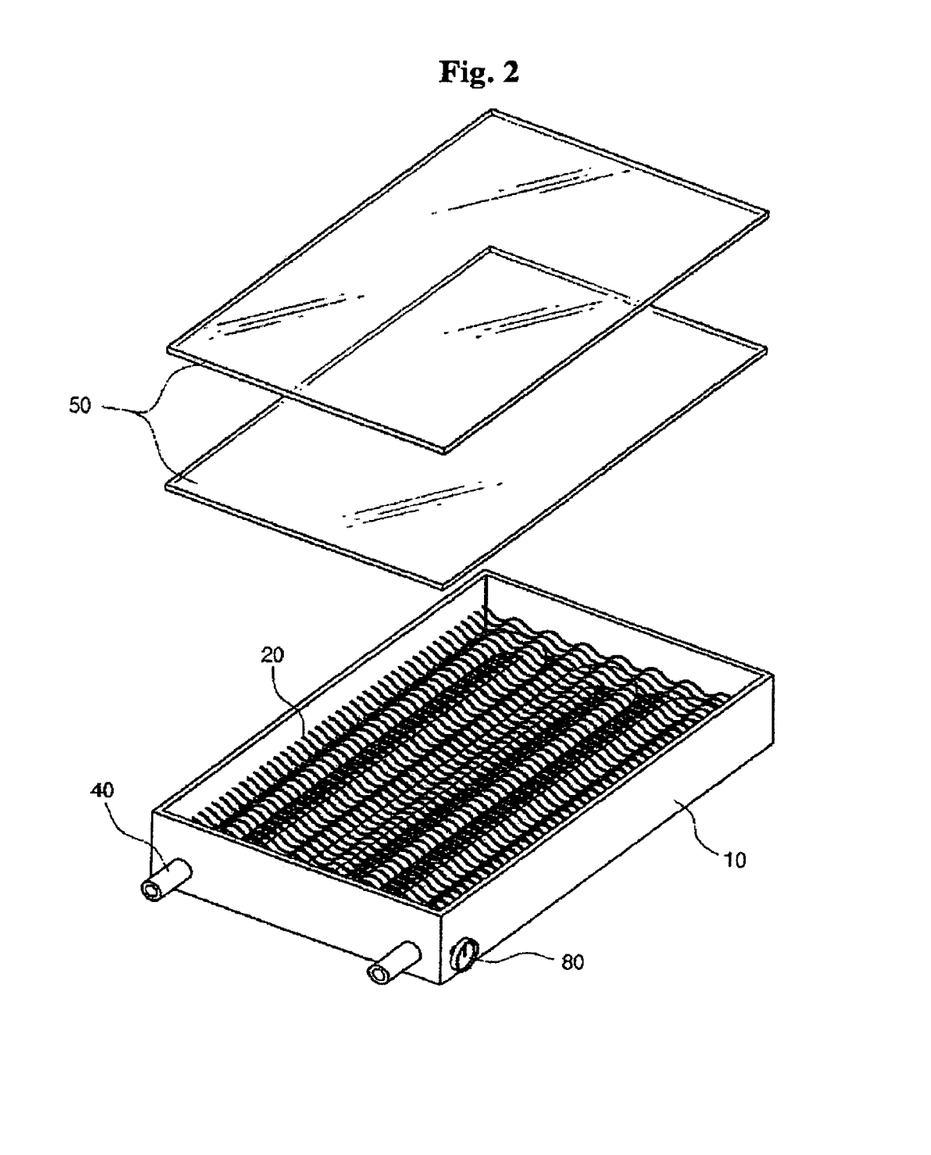
FIG. 2 is an exploded perspective view showing the apparatus for amplifying solar energy using recycling greenhouse gas according to the present invention.
Figure 3:
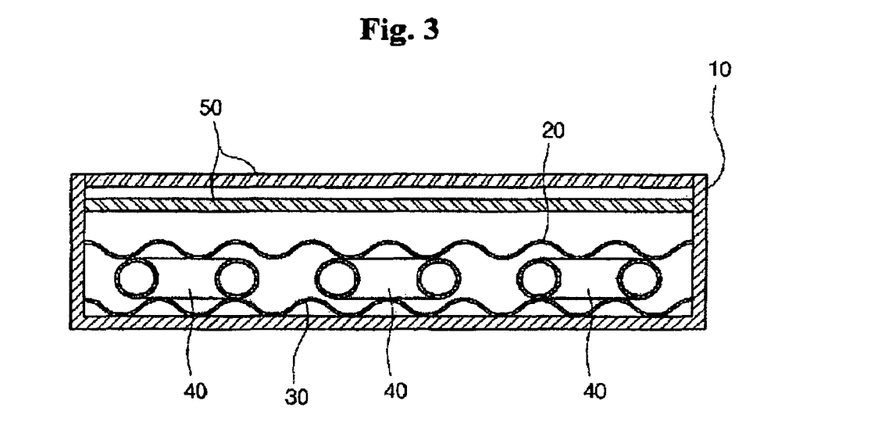
FIG. 3 is a sectional view showing the apparatus for amplifying solar energy using recycling greenhouse gas according to the present invention.
Figure 4:
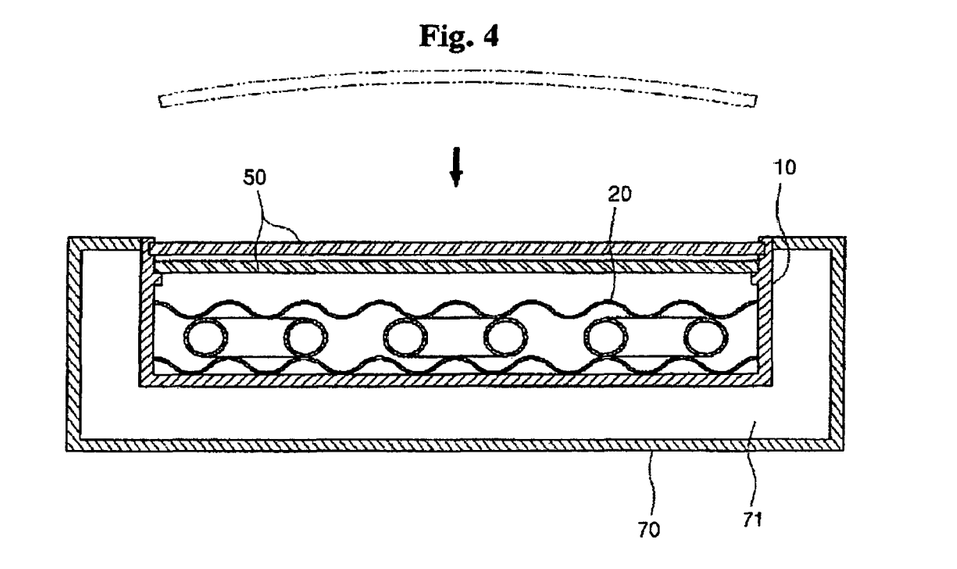
FIG. 4 is a sectional view showing the apparatus for amplifying solar energy using recycling greenhouse gas according to the present invention, further including an insulation case.

FIG. 1 is an assembling perspective view showing an apparatus for amplifying solar energy using recycling greenhouse gas according to the present invention, FIG. 2 is an exploded perspective view showing the apparatus for amplifying solar energy using recycling greenhouse gas according to the present invention, FIG. 3 is a sectional view showing the apparatus for amplifying solar energy using recycling greenhouse gas according to the present invention, and FIG. 4 is a sectional view showing the apparatus for amplifying solar energy using recycling greenhouse gas according to the present invention, further including an insulation case.

According to the present invention, there is provided an apparatus for amplifying solar energy using recycling greenhouse gas, basically including: a body 10 formed of a metal material and having a shape with a space formed at the inside thereof; upper and lower metal meshes 20 and 30 disposed in the space of the body 10 in such a manner as to be spaced apart upwardly and downwardly from each other by a given distance; a metal pipe 40 disposed between the upper and lower metal meshes 20 and 30; and one or more light-transmitting panels 50 adapted to seal the body 10, wherein the body 10 further has a gas-charging valve 60 adapted to charge sulfur hexafluoride SF6 to the sealed space thereof.

The body 10 is formed of one of steel, stainless steel, aluminum, and the like, and has a shape of a cylinder, a cuboid, or the like and open on the top surface thereof in such a manner as to communicate with the space formed at the inside thereof, so that the collection of the solar heat and the reflection of the solar light can be performed in the space at the inside of the body 10. The body 10 has an insulation case 70 formed of the same material and fixed to the outer surfaces thereof by means of conventional practices like welding, bolting and so on, or formed integrally thereto. Further, an insulation material 71 such as a cork, cotton, felt, carbonated cork, urethane, and the like is filled in a space between the insulation case 70 and the body 10, thereby reducing a degree of heat loss through the outer surfaces of the body 10. If the body 10 and the insulation case 70 are formed integrally to each other, the insulation case 70 has a through-hole formed thereon, through which the insulation material like urethane is directly filled in the sealed space between the body 10 and the insulation case 70.

The upper and lower metal meshes 20 and 30 are formed of silver, copper, platinum, aluminum, magnesium and the like having excellent thermal conductivity and has a shape of a mesh bent vertically and horizontally so as to reflect solar light at various angles, while being disposed in the space of the body 10 in such a manner as to be spaced apart upwardly and downwardly from each other by a given distance in a horizontal relation to the bottom surface of the body 10. The upper and lower metal meshes 20 and 30 have a size insertedly fitted to the inner surfaces of the body 10, thereby being disposed in the body 10 without any separate fixing means, and also serve to prevent the metal pipe 40 as will be discussed below from being moved in the body 10.

The metal pipe 40 is made of the same material as the upper and lower metal meshes 20 and 30 and is disposed between the upper and lower metal meshes 20 and 30 in such a manner as to be brought into close contact with the upper and lower metal meshes 20 and 30. That is, one metal pipe is folded by a plurality of times to partially face each other, thereby extending a passage through which liquid like water and oil or gas like air is passed in the body 10 to a maximum degree and increasing the energy applied to the liquid or gas. Further, the metal pipe 40 has one end and the other end respectively penetrating a side wall of the body 10, so that if the liquid or gas is supplied to one end thereof, the heated liquid and gas is discharged from the other end thereof. Under such position relation between the upper and lower metal meshes 20 and 30 and the metal pipe 40, the solar light reflected at various angles through the upper and lower metal meshes 20 and 30 is reacted with the sulfur hexafluoride SF6 to easily cause the greenhouse effect, thereby increasing the internal temperature of the body 10, transferring the heat of the upper and lower metal meshes 20 and 30 more easily heated than the metal pipe 40 to the metal pipe 40, and thus heating the metal pipe 40, so that the heating process of the metal pipe 40 is conducted in a triple manner. In this case, the inner surfaces of the body 10, the upper and lower metal meshes 20 and 30 and the metal pipe 40 are coated with matt black paint, thereby increasing the absorption ratio of the solar heat, and if they are coated with shiny black paint, the internal temperature of the body 10 is a little lowered, which is found through Tables 1 to 3 and FIGS. 6 to 8.

One or more light-transmitting panels 50 are disposed over the upper metal mesh 20 so as to seal the space inside the body 10 and are formed of a plastic synthetic resin like Polycarbonate or glass. As shown in the figures, the light-transmitting panels 50 are doubly disposed to seal the body 10 and are then fixed thereto by means of an adhesive like silicone. In this case, referring to the structure wherein the inner space of the body 10 is rigidly sealed by means of the light-transmitting panels 50, the light-transmitting panel 50 disposed at the lowermost position of the one or more light-transmitting panels 50 is formed of glass and disposed along seating protrusions 11 formed along the inner surfaces of the body 10 and fixed thereto by means of an adhesive like silicone, and the light-transmitting panel 50 disposed at the uppermost position of the one or more light-transmitting panels 50 is formed of Polycarbonate and inserted into insertion grooves 12 formed along the inner surfaces of the body 10 facing the light-transmitting panel through the application of an external force and fixed thereto by means of an adhesive, thereby providing a higher resistant strength against an external pressure when compared with the fixation of the light-transmitting panels 50 by means of just application of the adhesive and further increasing the area of the body 10 contacted with the light-transmitting panels 50, to which the adhesive is applied. Moreover, the light-transmitting panel made of glass having tighter air space than Polycarbonate is disposed at the lower position, and the light-transmitting panel made of Polycarbonate not easily broken by means of its own bending force is disposed at the upper position, thereby ensuring good sealing state of the body 10 and lowering the breakage possibility. Furthermore, each of the light-transmitting panels 50 has a center portion with a convex shape toward the bottom surface of the body 10, thereby functioning as a convex lens, so that the solar heat is collected to the inside of the body 10 to allow the heating temperature of the metal pipe 40 to be more improved.

Figure 5:
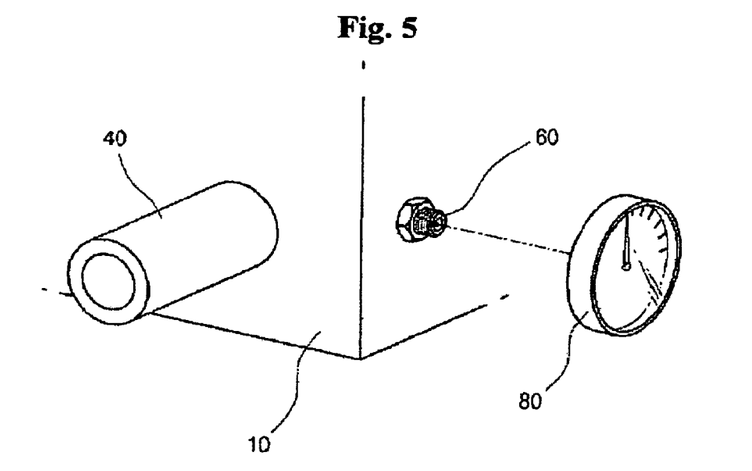
FIG. 5 is a perspective view showing the coupling relation between a gas-charging valve and a gas pressure gauge in the apparatus for amplifying solar energy using recycling greenhouse gas according to the present invention.

FIG. 5 is a perspective view showing the coupling relation between a gas-charging valve and a gas pressure gauge in the apparatus for amplifying solar energy using recycling greenhouse gas according to the present invention.

The gas-charging valve 60 is adapted to charge the sulfur hexafluoride SF6 to the sealed space of the body 10 and is used with all kinds of conventional valves capable of preventing the charged sulfur hexafluoride SF6 to the body 10 from being emitting to the outside. In this case, the reason why the sulfur hexafluoride SF6, instead of carbon dioxide, is used to obtain the greenhouse effect is that it is a greenhouse gas generating the highest greenhouse effect among gases and has high stability so that after one time charging, the charged state is maintained without any leakage for a long period of time. Further, the sulfur hexafluoride SF6 gas which is currently in a waste step after the existing industrial use is collected and recycled, thereby reducing earth warming. Additionally, after the sulfur hexafluoride SF6 is completely charged to the body 10 through the gas-charging valve 60, a gas pressure gauge 80, which is used in conventional practices, is disposed on the gas-charging valve 60 to easily check the discharging state of the sulfur hexafluoride SF6 as time is passed after the initial charging state, thereby recognizing the normal or abnormal state of the apparatus of the invention and the time needed for the charging of the sulfur hexafluoride SF6.

Hereinafter, an explanation on the experimental data through the apparatus for amplifying solar energy using recycling greenhouse gas according to the present invention and other comparative examples will be in detail given.

Figure 6:
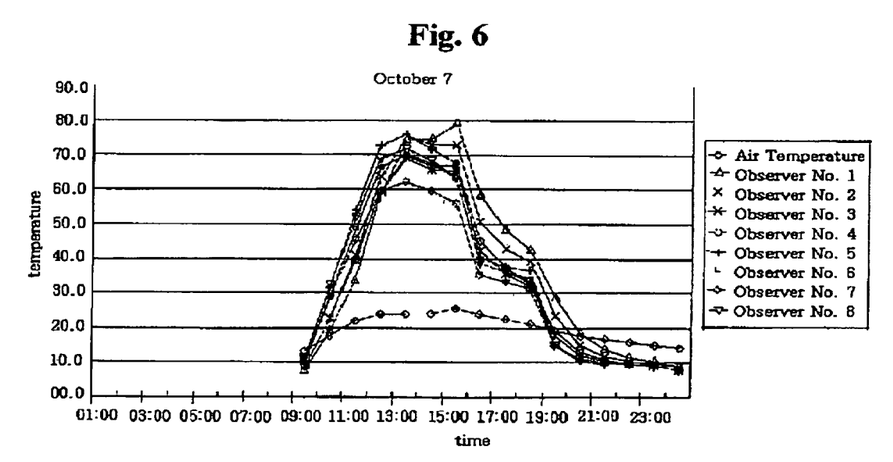
FIGS. 6 to 8 are graphs showing experimental data obtained in accordance with the temperature variations among the present invention and other comparative examples.
Figure 7:
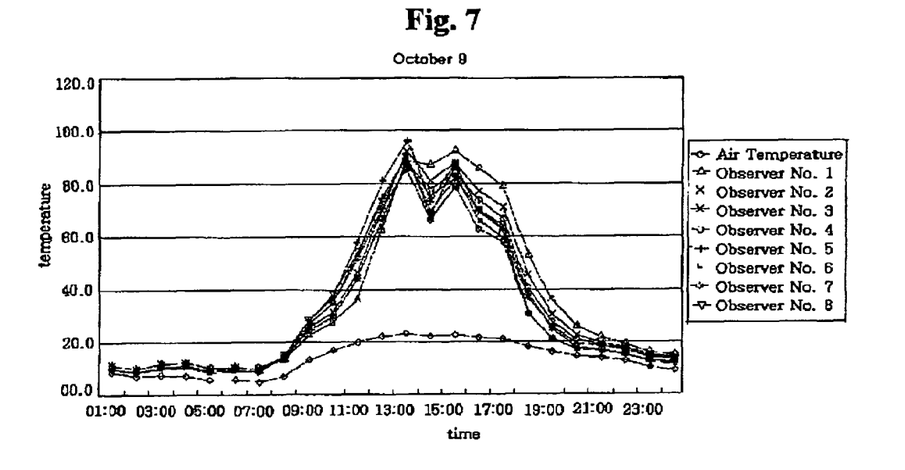
Figure 8:
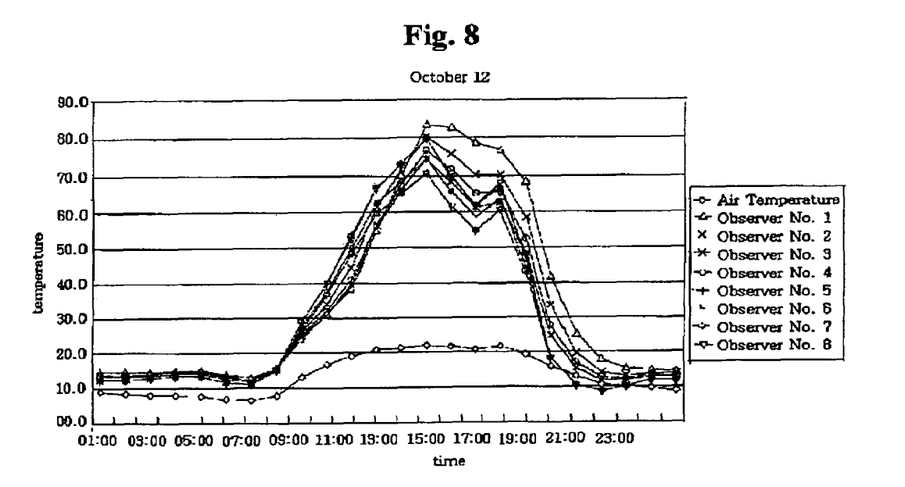

Observer No. 1 described in Tables 1 to 3 and FIGS. 6 to 8 has the structure of the invention wherein the body 10, the upper and lower metal meshes 20 and 30 and the metal pipe 40 are coated with matt black paint and the sulfur hexafluoride SF6 is charged to 100%, observer No. 2 has the same structure as in the observer No. 1, except that the sulfur hexafluoride SF6 is charged just to 50%, observer No. 3 has the same structure as in the observer No. 1, except that the sulfur hexafluoride SF6 is not charged, and observer No. 4 has the same structure as in the observer No. 1, except that the sulfur hexafluoride SF6 is not charged and they are coated with shiny black paint. Further, observer No. 5 has a structure wherein the sulfur hexafluoride SF6 is not charged and the bottom surface of the observer No. 1 is coated with black paint, observer No. 6 has the same structure as in the observer No. 1, except that the sulfur hexafluoride SF6 is not charged and glass powder is scattered on the internal bottom surface of the body 10 to induce scattered reflection, observer No. 7 has the same structure as in the observer No. 1, except that the sulfur hexafluoride SF6 is not charged and a tint sheet is attached to the light-transmitting panels 50 to prevent the solar light entering the inside of the body 10 from being emitted to the outside of the body 10, and observer No. 8 has the same structure as in the observer No. 1, except that the sulfur hexafluoride SF6 is not charged and black paint coating is not performed.

TABLE 1

Temperature variations by time between the invention and other comparative examples
(measured on Oct. 7, 2009, temperature unit: ° C.)

| Time | Air Temp. | Solar Radiation | Observer No. 1 | Observer No. 2 | Observer No. 3 | Observer No. 4 | Observer No. 5 | Observer No. 6 | Observer No. 7 | Observer No. 8 |
|---|---|---|---|---|---|---|---|---|---|---|
| 01:00 | | | | | | | | | | |
| 02:00 | | | | | | | | | | |
| 03:00 | | | | | | | | | | |
| 04:00 | | | | | | | | | | |
| 05:00 | | | | | | | | | | |
| 06:00 | | | | | | | | | | |
| 07:00 | | | | | | | | | | |
| 08:00 | | | | | | | | | | |
| 09:00 | 13.3 | 140.4 | 8.1 | 9.0 | 8.6 | 8.6 | 10.5 | 10.2 | 10.0 | 11.3 |
| 10:00 | 17.6 | 365.2 | 19.1 | 22.5 | 22.2 | 22.7 | 31.5 | 29.0 | 29.2 | 32.4 |
| 11:00 | 22.0 | 455.6 | 34.1 | 41.2 | 39.5 | 39.5 | 54.1 | 48.9 | 45.9 | 52.1 |
| 12:00 | 23.8 | 508.1 | 59.0 | 64.0 | 59.5 | 59.6 | 72.8 | 66.5 | 59.5 | 69.1 |
| 13:00 | 24.1 | 383.7 | 74.6 | 74.7 | 69.0 | 69.7 | 75.9 | 70.5 | 62.5 | 71.8 |
| 14:00 | 24.1 | 389.2 | 74.6 | 73.0 | 65.7 | 66.8 | 71.6 | 67.6 | 59.8 | 68.3 |
| 15:00 | 25.5 | 291.6 | 79.0 | 72.9 | 65.6 | 67.1 | 67.7 | 63.7 | 56.1 | 63.6 |
| 16:00 | 23.9 | 135.6 | 58.7 | 50.8 | 42.5 | 45.4 | 40.6 | 38.9 | 35.7 | 39.0 |
| 17:00 | 22.6 | 113.4 | 48.7 | 43.2 | 35.8 | 37.8 | 37.9 | 36.1 | 33.4 | 36.3 |
| 18:00 | 21.2 | 80.7 | 43.0 | 39.4 | 31.9 | 32.5 | 36.6 | 34.1 | 31.4 | 33.4 |
| 19:00 | 19.4 | 2.8 | 28.8 | 23.7 | 18.1 | 19.3 | 15.3 | 15.0 | 14.8 | 15.0 |
| 20:00 | 18.0 | 0.0 | 18.6 | 15.0 | 12.3 | 13.0 | 10.5 | 10.4 | 10.9 | 11.0 |
| 21:00 | 16.8 | 0.0 | 13.8 | 11.6 | 10.2 | 10.7 | 9.6 | 9.4 | 10.0 | 10.1 |
| 22:00 | 15.9 | 0.0 | 11.6 | 10.3 | 9.6 | 9.9 | 9.3 | 9.2 | 9.8 | 9.9 |
| 23:00 | 15.1 | 0.0 | 10.3 | 9.5 | 8.9 | 9.2 | 8.7 | 8.6 | 9.2 | 9.3 |
| 00:00 | 14.3 | 0.0 | 9.3 | 8.5 | 7.8 | 8.1 | 7.8 | 7.5 | 8.0 | 8.1 |
| Mean Value | 20.1 | 184.9 | 38.1 | 36.7 | 32.7 | 33.5 | 36.2 | 33.9 | 31.4 | 34.9 |
| Moment Max. Value | 26.9 | 537.0 | 86.4 | 85.0 | 78.2 | 78.1 | 87.7 | 81.9 | 73.4 | 84.4 |
| Moment Min. Value | 13.0 | 0.0 | 8.5 | 7.7 | 6.9 | 7.3 | 7.0 | 6.6 | 7.0 | 6.9 |

Tables 1 to 3 and FIGS. 6 to 8 as described below show the comparison between the experimental data obtained in accordance with the temperature variations among the present invention and other comparative examples.

As shown in Table 1 and FIG. 6, it is appreciated that the internal temperatures of the observer No. 1 having the structure of the invention have the highest mean, moment maximum, and moment minimum values in those in the other comparative examples, which are measured on Oct. 7, 2009.

TABLE 2

Temperature variations by time between the invention and other comparative examples
(measured on Oct. 9, 2009, temperature unit: ° C.)

| Time | Air Temp. | Solar Radiation | Observer No. 1 | Observer No. 2 | Observer No. 3 | Observer No. 4 | Observer No. 5 | Observer No. 6 | Observer No. 7 | Observer No. 8 |
|---|---|---|---|---|---|---|---|---|---|---|
| 01:00 | 8.7 | 0.0 | 12.5 | 11.7 | 10.9 | 11.2 | 9.7 | 9.5 | 10.0 | 10.1 |
| 02:00 | 7.1 | 0.0 | 11.0 | 10.5 | 9.6 | 9.9 | 8.4 | 8.2 | 8.6 | 8.6 |
| 03:00 | 7.7 | 0.0 | 11.9 | 11.7 | 11.3 | 11.5 | 10.0 | 9.9 | 10.4 | 10.6 |
| 04:00 | 7.3 | 0.0 | 12.1 | 12.1 | 11.6 | 11.9 | 10.5 | 10.4 | 11.1 | 11.3 |
| 05:00 | 5.9 | 0.0 | 10.9 | 10.7 | 10.0 | 10.4 | 8.8 | 8.6 | 9.1 | 9.3 |
| 06:00 | 5.8 | 0.0 | 11.0 | 10.8 | 10.2 | 10.5 | 9.1 | 9.1 | 9.5 | 9.8 |
| 07:00 | 5.2 | 0.7 | 10.7 | 10.4 | 9.7 | 9.9 | 8.7 | 8.6 | 8.9 | 9.1 |
| 08:00 | 7.1 | 25.6 | 13.9 | 14.6 | 14.2 | 14.2 | 14.7 | 14.5 | 14.4 | 15.0 |
| 09:00 | 13.4 | 184.1 | 23.3 | 25.4 | 24.2 | 24.4 | 27.7 | 26.9 | 26.1 | 28.2 |
| 10:00 | 17.1 | 328.2 | 27.8 | 31.0 | 29.2 | 29.8 | 37.1 | 35.0 | 35.2 | 38.3 |
| 11:00 | 19.9 | 434.1 | 36.6 | 46.4 | 44.1 | 44.3 | 57.9 | 53.4 | 51.9 | 54.1 |
| 12:00 | 22.1 | 501.5 | 63.3 | 70.5 | 67.4 | 66.6 | 81.0 | 75.0 | 71.1 | 73.2 |
| 13:00 | 23.1 | 479.7 | 89.1 | 92.1 | 87.3 | 86.8 | 96.1 | 90.1 | 85.3 | 89.7 |
| 14:00 | 22.1 | 314.5 | 87.0 | 81.0 | 75.2 | 78.0 | 72.8 | 69.5 | 66.0 | 68.1 |
| 15:00 | 22.7 | 394.1 | 92.7 | 88.2 | 82.1 | 83.6 | 87.7 | 82.7 | 78.7 | 86.7 |
| 16:00 | 21.7 | 262.0 | 86.0 | 77.5 | 70.1 | 73.6 | 69.4 | 69.4 | 62.8 | 69.8 |
| 17:00 | 21.2 | 184.0 | 79.3 | 71.0 | 63.0 | 66.5 | 62.7 | 59.8 | 58.1 | 64.7 |
| 18:00 | 18.3 | 35.2 | 53.2 | 45.5 | 37.3 | 40.5 | 31.0 | 30.5 | 30.3 | 39.4 |
| 19:00 | 16.5 | 9.7 | 36.0 | 30.4 | 25.8 | 27.8 | 21.4 | 21.3 | 21.3 | 25.1 |
| 20:00 | 14.7 | 11.9 | 26.1 | 22.3 | 19.7 | 20.8 | 17.0 | 16.9 | 17.0 | 18.1 |
| 21:00 | 14.1 | 0.3 | 22.0 | 19.8 | 18.3 | 18.8 | 16.8 | 16.7 | 16.7 | 17.1 |
| 22:00 | 12.8 | 2.4 | 19.3 | 17.8 | 16.8 | 17.1 | 15.4 | 15.3 | 15.4 | 15.4 |
| 23:00 | 10.4 | 12.7 | 16.1 | 15.0 | 14.0 | 14.3 | 12.6 | 12.5 | 12.7 | 12.8 |
| 00:00 | 9.4 | 12.8 | 14.8 | 14.0 | 13.2 | 13.5 | 12.1 | 12.0 | 12.2 | 12.3 |
| Mean Value | 13.9 | 133.1 | 36.1 | 35.0 | 32.3 | 33.2 | 33.3 | 31.8 | 31.0 | 33.2 |
| Moment Max. Value | 24.7 | 548.3 | 99.2 | 99.9 | 94.1 | 93.0 | 102.7 | 96.5 | 91.3 | 102.4 |
| Moment Min. Value | 4.8 | 0.0 | 10.3 | 9.9 | 9.2 | 9.4 | 7.9 | 7.7 | 8.1 | 8.2 |

As shown in Table 2 and FIG. 7, it is appreciated that the internal temperatures of the observer No. 1 having the structure of the invention have the highest mean, moment maximum, and moment minimum values in those in the other comparative examples, which are measured on Oct. 9, 2009.

TABLE 3

Temperature variations by time between the invention and other comparative examples
(measured on Oct. 12, 2009, temperature unit: ° C.)

| Time | Air Temp. | Solar Radiation | Observer No. 1 | Observer No. 2 | Observer No. 3 | Observer No. 4 | Observer No. 5 | Observer No. 6 | Observer No. 7 | Observer No. 8 |
|---|---|---|---|---|---|---|---|---|---|---|
| 01:00 | 8.9 | 0.0 | 14.4 | 13.9 | 13.4 | 13.5 | 12.3 | 12.3 | 12.5 | 12.5 |
| 02:00 | 8.4 | 0.0 | 14.3 | 13.9 | 13.4 | 13.6 | 12.4 | 12.3 | 12.6 | 12.6 |
| 03:00 | 8.0 | 0.0 | 14.3 | 14.1 | 13.7 | 13.8 | 12.8 | 12.7 | 12.9 | 13.0 |
| 04:00 | 7.9 | 0.0 | 14.7 | 14.6 | 14.2 | 14.4 | 13.4 | 13.3 | 13.5 | 13.6 |
| 05:00 | 7.7 | 0.0 | 14.8 | 14.6 | 14.2 | 14.4 | 13.3 | 13.2 | 13.5 | 13.6 |
| 06:00 | 6.9 | 0.0 | 13.8 | 13.4 | 12.7 | 12.9 | 11.4 | 11.3 | 11.7 | 11.8 |
| 07:00 | 6.5 | 0.4 | 13.0 | 12.7 | 12.0 | 12.2 | 10.8 | 10.7 | 11.0 | 11.1 |
| 08:00 | 7.7 | 38.0 | 15.1 | 15.4 | 14.8 | 15.0 | 15.1 | 14.8 | 14.8 | 15.5 |
| 09:00 | 12.9 | 117.9 | 23.9 | 25.7 | 24.7 | 25.0 | 28.5 | 27.5 | 26.8 | 28.8 |
| 10:00 | 16.5 | 212.8 | 30.9 | 34.0 | 31.2 | 32.0 | 39.5 | 37.6 | 36.8 | 39.9 |
| 11:00 | 19.0 | 275.6 | 38.3 | 44.4 | 39.6 | 41.0 | 53.4 | 49.9 | 48.3 | 52.6 |
| 12:00 | 20.8 | 307.1 | 54.9 | 61.3 | 55.9 | 56.4 | 66.7 | 62.6 | 59.7 | 66.5 |
| 13:00 | 21.3 | 350.0 | 70.4 | 71.7 | 65.8 | 67.5 | 73.3 | 68.5 | 65.3 | 73.5 |
| 14:00 | 22.0 | 367.4 | 84.6 | 81.3 | 74.9 | 77.3 | 80.4 | 75.1 | 70.9 | 80.7 |
| 15:00 | 21.7 | 296.8 | 84.0 | 76.4 | 68.3 | 72.0 | 70.3 | 65.9 | 61.6 | 70.0 |
| 16:00 | 20.9 | 229.1 | 79.4 | 70.4 | 61.3 | 65.1 | 62.3 | 58.5 | 54.6 | 61.8 |
| 17:00 | 21.7 | 214.7 | 77.4 | 70.4 | 62.8 | 65.7 | 66.9 | 63.9 | 60.5 | 67.8 |
| 18:00 | 19.4 | 86.8 | 68.6 | 58.7 | 48.3 | 52.4 | 48.1 | 44.4 | 43.4 | 47.0 |
| 19:00 | 15.9 | 3.3 | 42.0 | 33.4 | 24.8 | 27.7 | 18.6 | 18.1 | 17.9 | 17.8 |
| 20:00 | 13.1 | 0.0 | 25.4 | 19.8 | 15.3 | 16.9 | 10.6 | 10.4 | 10.5 | 10.5 |
| 21:00 | 10.7 | 0.0 | 17.9 | 14.3 | 11.8 | 12.6 | 8.9 | 8.9 | 9.2 | 9.2 |
| 22:00 | 9.7 | 0.0 | 15.2 | 13.0 | 11.6 | 12.1 | 10.0 | 10.0 | 10.2 | 10.3 |
| 23:00 | 9.7 | 0.0 | 14.9 | 13.7 | 12.9 | 13.2 | 11.9 | 11.8 | 12.0 | 12.0 |
| 00:00 | 8.9 | 0.0 | 14.3 | 13.6 | 12.8 | 13.0 | 11.8 | 11.7 | 11.9 | 11.9 |

TABLE 3-continued

Temperature variations by time between the invention and other comparative examples
(measured on Oct. 12, 2009, temperature unit: ° C.)

| Time | Air Temp. | Solar Radiation | Observer No. 1 | Observer No. 2 | Observer No. 3 | Observer No. 4 | Observer No. 5 | Observer No. 6 | Observer No. 7 | Observer No. 8 |
|---|---|---|---|---|---|---|---|---|---|---|
| Mean Value | 13.6 | 104.2 | 35.7 | 33.9 | 30.4 | 31.6 | 31.8 | 30.2 | 29.3 | 31.8 |
| Moment Max. Value | 22.6 | 506.2 | 90.4 | 89.1 | 82.6 | 84.2 | 92.2 | 85.3 | 80.6 | 92.8 |
| Moment Min. Value | 6.3 | 0.0 | 12.8 | 12.4 | 11.2 | 11.7 | 8.4 | 8.3 | 8.6 | 8.6 |

As shown in Table 3 and FIG. 8, it is appreciated that the internal temperatures of the observer No. 1 having the structure of the invention have the highest mean, moment maximum, and moment minimum values in those in the other comparative examples, which are measured on Oct. 12, 2009.

As described above, the apparatus for amplifying solar energy using recycling greenhouse gas according to the present invention is structured to seal the inner space of the body, thereby preventing the solar heat collected in the inner space of the body from being emitted to the outside, and at the same time to allow the solar light reflected at various angles through the collision with the upper and lower metal meshes to be reacted with the sulfur hexafluoride SF6, thereby easily causing the greenhouse effect and increasing the temperature of the metal pipe, so that the heated liquid and gas passing through the metal pipe can be applicable for the use of hot water supply and heating.

What is claimed is:

1. An apparatus for amplifying solar energy by recycling greenhouse gas comprising:
   a body (10) made of a metal material forming a container shape with opened top surface to form a space inside thereof;
   a pair of upper and lower metal meshes (20, 30) disposed in the space of the body (10) to locate apart up and down each other with a vertical distance from the bottom surface of the body (10);
   a metal pipe (40) forming a coil shape by bent several times, disposed between the upper and lower metal meshes (20, 30) to contact with the upper and lower metal meshes (20, 30) and having one inlet end and the other outlet end to pass through a side wall of the body (10);
   a pair of transparent panels (50) for transmitting the sun beams disposing over the upper metal mesh (20) to seal the space inside of the body (10);
   a sulfur hexafluoride (SF6) charged in the sealed space inside of the body (10); and
   a gas-charging valve (60) disposed on a side wall for charging the sulfur hexafluoride (SF6) into the sealed space.

2. The apparatus for amplifying solar energy according to claim 1, wherein said metal pipe (40) is supplied the greenhouse gas to one inlet end.

3. The apparatus for amplifying solar energy according to claim 1, wherein the inner surfaces of the body (10), the upper and lower metal meshes (20, 30) and the metal pipe (40) are coated with matt black paint.

4. The apparatus for amplifying solar energy according to claims 1, wherein the body (10) further comprising: an insulation case (70) for sealing the outer surfaces and an insulation material (71) filled in a clearance between the insulation case (70) and the body (10).

5. The apparatus for amplifying solar energy according to claim 1, wherein the gas-charging valve (60) further comprising: a gas pressure gauge (80) to check the charging state of the sulfur hexafluoride (SF6).

6. The apparatus for amplifying solar energy according to claim 1, wherein each of the transparent panels (50) further comprising: a center portion with a convex surface outward from the bottom of the body (10).

7. The apparatus for amplifying solar energy according to claim 6, further comprising: a lower transparent panel (50) is made of a glass and mounted along the protruded mounting seat (11) formed along the periphery of inner surface of the body (10) and fixed by a sealant, and a upper transparent panel (50) disposed above the lower transparent panel (50) is made of a Polycarbonate and mounted in a insertion groove (12) formed along the periphery of the inner surface of the body (10) and fixed by means of the sealant.

* * * * *